Oct. 20, 1931.   W. A. MULLER ET AL   1,828,725
FISH CLEANING MACHINE
Filed May 21, 1929   3 Sheets-Sheet 1
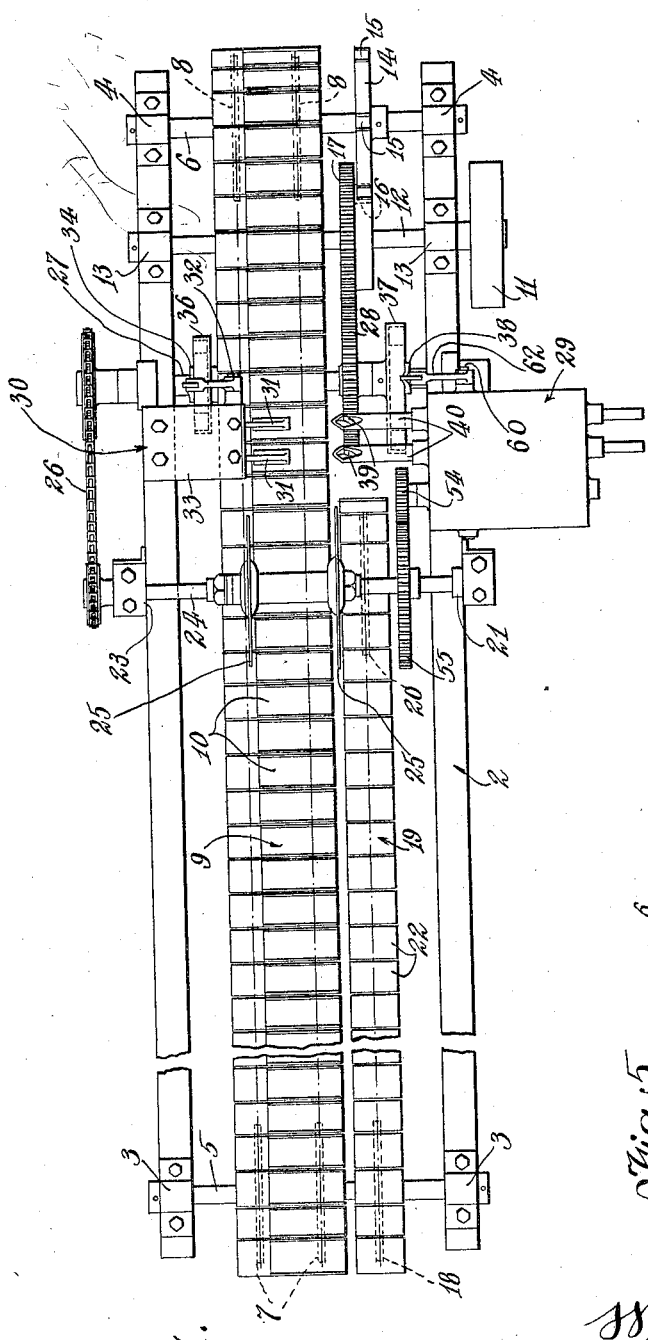
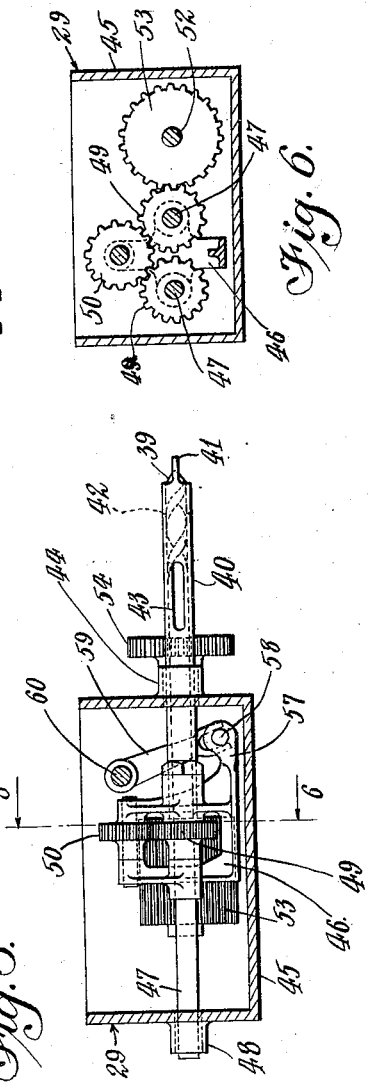
Inventors
Wesley A. Muller
Burt C. Youman
By Lyon & Lyon
Attorneys Oct. 20, 1931.  W. A. MULLER ET AL  1,828,725
FISH CLEANING MACHINE
Filed May 21, 1929   3 Sheets-Sheet 2

Inventors
Wesley A. Muller
Burt C. Youman
By Lyon & Lyon
Attorneys

Oct. 20, 1931.  W. A. MULLER ET AL  1,828,725
FISH CLEANING MACHINE
Filed May 21, 1929   3 Sheets-Sheet 3

Inventors
Wesley A. Muller
Burt C. Youman
By Lyon & Lyon
Attorneys

Patented Oct. 20, 1931

1,828,725

UNITED STATES PATENT OFFICE

WESLEY A. MULLER, OF MONTEREY, AND BURT C. YOUMAN, OF SAN FRANCISCO, CALIFORNIA, ASSIGNORS TO CALIFORNIA PACKING CORPORATION, OF SAN FRANCISCO, CALIFORNIA, A CORPORATION OF NEW YORK

FISH CLEANING MACHINE

Application filed May 21, 1929. Serial No. 364,746.

This invention relates to a machine for cleaning fish.

More particularly, an object of the present invention is to provide a continuously operating machine which is adapted to remove heads and tails and clean the visceral cavities of fish.

A further object of the invention is to provide a machine for cleaning fish in which there is provided means for cleaning the visceral cavities of the fish more completely and thoroughly than is accomplished by the fish cleaning machines now in use.

The fish cleaning machine of the present invention provides a continuous conveyor upon which fish are advanced to a cutting knife or knives for removing the heads and tails of the fish, and on the same conveyor the fish are then presented to the visceral cavity cleaning members which are constructed to be automatically advanced into the cavities of the fish and there operated to clean said cavities.

The entrail removing members of the machine are generally in the form of slowly revolving augers which operate on the entrails of the fish by entangling the same upon the auger-like members, so that the entrails of the fish are removed upon the retraction of the slowly revolving auger-like members from the visceral cavity of the fish.

Prior to the invention of the present machine, various methods of removing the entrails from the fish have been used, but such methods rely upon such schemes as removing the entrails by suction, or removing the entrails by a wiping brush, or removing the entrails by a rapidly revolving auger-like bit inserted into the cavities of the fish which operates mostly by principles of centrifugal force to comminute and simultaneously eject the entrails from the fish. All such methods and means of cleaning fish incompletely clean the fish.

By the method and apparatus of the present invention it is found that by entangling the entrails upon a slowly revolving auger-like member inserted into the visceral cavities of the fish and then slowly withdrawing the member while revolving the same, the entrails may be bodily retracted from the fish and a very clean operation effected.

Figure 2:
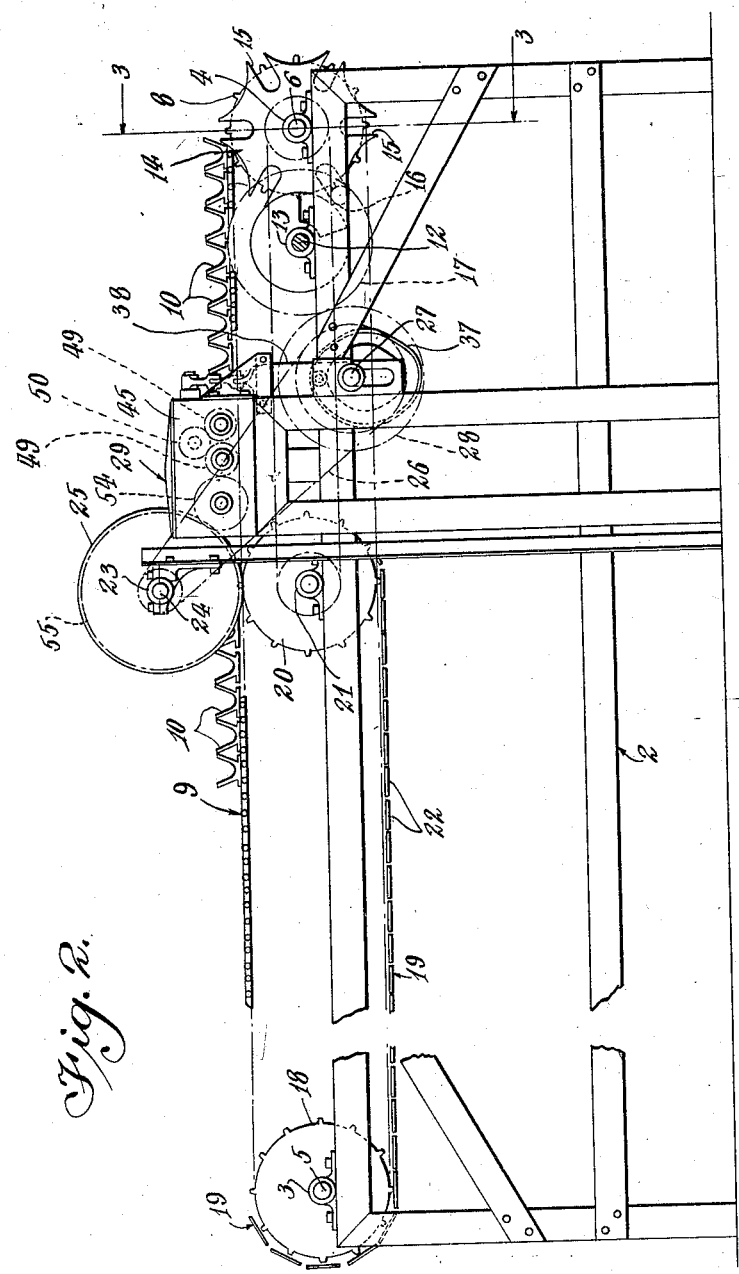
Figure 3:
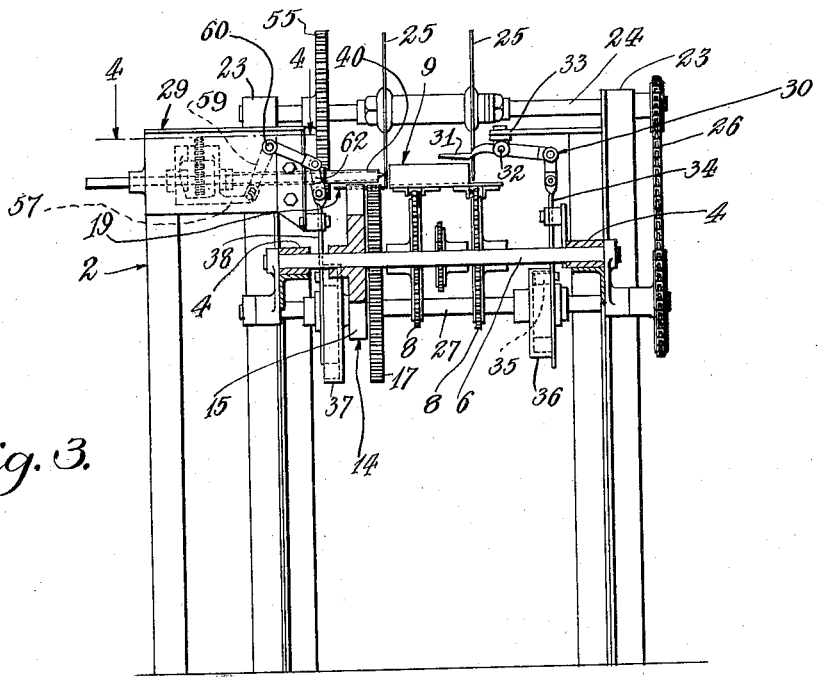
Figure 4:
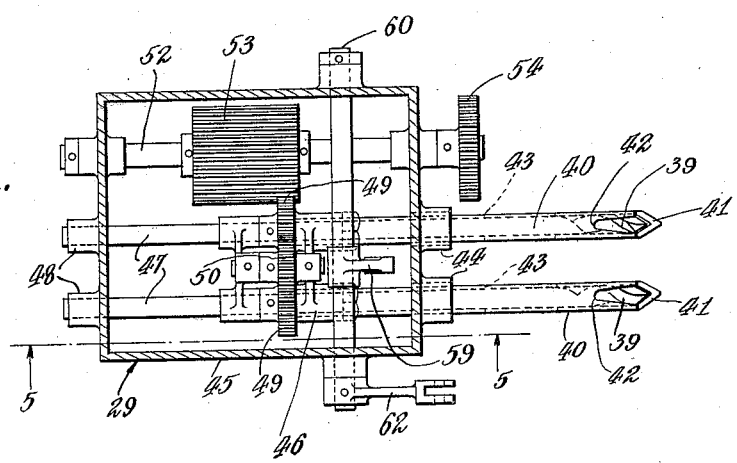

The present invention together with various further objects and advantages thereof will be best understood from a description of a preferred form of fish cleaning machine embodying the invention. For this purpose, there is hereafter described the preferred form of the machine, the description being given in connection with the accompanying drawings, in which Figure 1 is a plan view.
Figure 2 is an elevation.
Figure 3 is a vertical section on the line 3—3 of Figure 2.
Figure 4 is a fragmentary section through the entrail driving mechanism taken on the line 4—4 of Figure 3.
Figure 5 is a section on the line 5—5 of Figure 4, and
Figure 6 is a section on the line 6—6 of Figure 5.

Referring to the drawings, the machine comprises a suitable frame 2, upon the ends of which are mounted bearings 3 and 4 of conveyor shafts 5 and 6, respectively. The conveyor shaft 5 mounts conveyor sprockets 7 and the conveyor shaft 6 mounts the conveyor sprockets 8. Trained over the conveyor sprockets 7 and 8 is a continuous conveyor 9 formed of individual cup-like members 10 which serve as holders for individual fish to be cleaned. The fish for the machine may be placed in the individual fish holding members 10 by machine or by hand. In case the fish are to be fed to the machine by mechanical means, the conveyor may be considerably shortened over the illustration in Figures 1 and 2.

The machine in operation is continuously driven by a belt pulley 11 which has an intermittent drive connection with the conveyor 9. Said intermittent drive connection is formed as follows:

The belt pulley 11 is mounted on a shaft 12 in bearings 13 supported by the frame 2. The shaft 12 has an escapement drive with the conveyor shaft, said escapement drive is formed by a rotary cam 14 mounted on the conveyor shaft 6, which rotary cam 14 is provided with a plurality of radial slots 15 which are adapted to be successively engaged and released by an operating pin 16 carried by a gear wheel 17, mounted on the pulley shaft 12.

The radial slots 15 on the cam 14 are positioned a distance apart, so that on each revolution of the operating pin 16 causes the pin to engage one of the slots 15 and rotate the cam 14 a partial revolution, releasing the cam and positioning a second succeeding slot where the operating pin will engage the same upon the start of its next revolution.

The escapement mechanism thus described causes the conveyor 9 to be advanced in operation in a step by step motion in which the periods of advance are relatively short, as compared with the periods of rest of the conveyor.

There is also provided a further sprocket 18 on the front conveyor shaft 5 over which is trained a supplemental fish conveyor 19, the forward end of which is trained over a sprocket 20 on a shaft journaled in bearings 21 near the center part of the machine. This supplemental conveyor 19 also is provided with individual cup-like members 22 aligned with the cup-like members 10 of the main conveyor 9. The supplemental conveyor in use operates as a means for supporting the heads of the fish which are desired to overhang the conveyor 9 so that these heads may be severed by suitable cutting knives.

Journaled in bearings 23, supported by the frame 2 near the center of the machine and at a point above the conveyor 10, is a cutter shaft 24 which is preferably provided with a pair of disc cutting knives 25 positioned to engage the heads and tails of fish carried by conveyor 9.

Said cutter shaft 24 is driven by a chain drive 26 from a shaft 27, which shaft 27 is journaled in bearings supported by the frame 2 near the pulley shaft 12 and said shaft 27 is provided with a gear 28, engaging the gear wheel 17 of the pulley shaft so that the shaft is continuously driven during operation.

Shortly beyond the disc cutting knives 25 the supplemental conveyor 19 terminates and the machine is provided with an entrail removing mechanism 29 and with a fish grasping mechanism 30. The fish grasping mechanism comprises gripper members 31 of which two are shown, said gripper members being pivoted as indicated at 32 to a bracket 33, supported by the frame 2 of the machine at a position slightly above the conveyor 9, so that the gripper members 31 may be rocked on their pivots 32 to engage the fish held in the conveyor pockets 10 during the periods that the conveyor is at rest. The operating mechanism for the gripper arms comprises a pitman arm 34 having a roller 35 operating within a groove of a rotary cam 36, secured to the shaft 27 which thus operates as a crank shaft in the mechanism.

The groove of the rotary cam 36 is suitably shaped so that upon each revolution of the pulley shaft 12, the gripper members 31 are rocked into engagement with the fish in the conveyor 9 during the period of time that the conveyor is stationary and released just before the engagement of the operating pin or roller with the succeeding radial groove 14 of the escapement driving cam of the conveyor.

The crankshaft 27 also is provided with a rotary cam 37 connected with a roller on a pitman arm 38, which provides a means for operating the entrail removing mechanism.

The entrail removing mechanism comprises a pair of auger-like entrail removing and entangling members 39, which members are, in the major part, covered by cylindrical shields or guards 40. The ends of the cylindrical shields or guards are provided with a diamond shape strip 41 passing over the ends of the augers 39, and the ends of the guards or shields 40 are further provided with slots 42. By this construction, the entrail removing augers are prevented from cutting into the fish or entrails and the entrails are only drawn into the augers so that they are to a large extent, maintained together in the entrail removing operations. Spaced from the end of the augers, the guards or shields 40 are provided with side openings 43 from which may be discharged the entrails entering the space between the augers and shields.

The augers and shields pass through guides 44, into a control box 45. Within the control box 45, the shields or guards are attached to carriers 46 which operates as a means for advancing and retracting the augers during operation. The augers have their shanks 47 extending through the carriers 46 and through bearings and guides 48 on the opposite end of the box 45.

The carriers 46 are shaped so that in the center of said carriers there are received auger driving pinions 49 which are rigid with the auger shanks and serve as a means for revolving augers during operation. The auger carriers also support an intermediate pinion 50 which meshes with both of the auger pinions 49 so that if one of said pinions is driven, the other pinion and its auger will likewise be driven.

52 indicates a driving shaft journaled in the ends of the box 45 and provided with an elongated gear 53, engaging one of the driving gears 49 of the augers and shaped so that the pinion gear 49 may be slid relative to the gear 53 without disengaging therefrom. The driving shaft 52 is provided externally of the box 45, with a gear 54, which gear continually engages a gear 55 on the cutter shaft 24.

It will thus be seen that continuously during operation of the machine, the augers 39 are revolved. The size of gearing interconnecting the augers back to the pulley shaft 12 is so chosen in operation and the conveyor is driven in operation at a rate, so that the auger members 39 revolve at a comparatively slow rate or a rate just sufficient to enable these auger members to entangle the entrails of the fish and draw said entrails mainly in an uncomminuted state into the space between the shields 40 and the augers, where, upon retraction of the auger members, the entire entrails of the fish may be bodily removed.

The auger carrier 46 is shown as provided with a forwardly extending arm 57 having a rod 58 slidably engaged by the slotted end of a rocker arm 59. The rocker arm 59 is mounted upon a shaft 60 journaled in the box 45 and extending up and at right angles to the auger shanks 47. The rockers 59 on the shaft 60 have another end connected by a link 62 with the pitman 38 leading to the cam 37 on the crankshaft 27. The cam 37 is suitably shaped so that during the periods the conveyor shaft 9 is stationary, the rocker 59 is rocked first to advance the carriers 46 and thereby the augers 43, towards the fish in the conveyor pockets 10 and into the visceral cavities of said fish, and then again to retract the augers 39 from the conveyor pockets 10, so that a further motion of the conveyor may be permitted to position additional fish in position to be operated on by the entrail removing members or augers.

With the machine of the present invention, it is not necessary to accurately position the fish within the pockets of the conveyor 9 with any particular side of the fish up, since the entrail removing members or augers 39 are mounted on a mechanism positioned to operate on the fish when they are on the conveyor at a point considerably spaced from the conveyor sprockets, whereby the augers operate at a point where the conveyor possesses sufficient flexibility so that the augers advancing into the fish will self-seat or locate the visceral cavities of the fish, whether these visceral cavities are located at the top or bottom of the fish as it lies in the fish holding members or cups 10.

While the particular form of fish cleaning machine herein described is well adapted to carry out the objects of the invention, various changes and modifications may be made without departing from the invention, and the invention is of the scope of the following claims.

We claim:

1. A fish cleaning machine comprising revolvable entrail removing members, means for axially advancing said entrail removing member during fish cleaning operations while rotating the same, and a guard for said entrail removing members operative to prevent the entrail removing members cutting the fish.

2. A fish cleaning machine comprising, a fish holding member, a revolvable entrail removing member, means for moving said entrail removing member into and then out of the visceral cavity of the fish on said fish holding member, and guard means movable with said entrail removing member operative to prevent said entrail removing member from cutting the fish.

3. In a fish cleaning machine, the combination with a revolvable and axially movable entrail removing member, a guard for said entrail removing member having an opening at one end of said member and a discharge port at another portion of said guard.

Signed at Monterey, California, this 24th day of April, 1929, by WESLEY A. MULLER.

Signed at San Francisco, California, this 26th day of April, 1929, by BURT C. YOUMAN.

WESLEY A. MULLER.
BURT C. YOUMAN.